United States Patent [19]

Tanaka

[11] Patent Number: 5,479,231
[45] Date of Patent: Dec. 26, 1995

[54] FILM ADVANCING MECHANISM

[76] Inventor: Minoru Tanaka, 7-20, Shimizu 1-chome, Suwa-shi, Nagano-ken, Japan

[21] Appl. No.: 254,349

[22] Filed: Jun. 6, 1994

[30] Foreign Application Priority Data

Dec. 27, 1993 [JP] Japan ................................. 5-330546
Jan. 19, 1994 [JP] Japan ................................. 6-004253

[51] Int. Cl.$^6$ .................................................. G03B 1/12
[52] U.S. Cl. ..................................... 354/173.1; 354/214
[58] Field of Search ............................... 354/173.1, 212, 354/214

[56] References Cited

U.S. PATENT DOCUMENTS

| | | | |
|---|---|---|---|
| 4,482,226 | 11/1984 | Tamamura | 354/173.1 |
| 4,629,301 | 12/1986 | Haraguchi et al. | 354/173.1 |
| 4,766,452 | 8/1988 | Ohara et al. | 354/173.1 |
| 4,829,328 | 5/1989 | Tanaka et al. | 354/173.1 |
| 4,963,905 | 10/1990 | Haraguchi et al. | 354/173.1 |
| 5,105,212 | 4/1992 | Kitazawa | 354/173.1 |
| 5,160,953 | 11/1992 | Iwashita | 354/173.1 |
| 5,307,102 | 4/1994 | Ohara | 354/173.1 |
| 5,323,197 | 6/1994 | Alligood | 354/173.1 |

Primary Examiner—A. A. Mathews
Attorney, Agent, or Firm—Jordan and Hamburg

[57] ABSTRACT

An object of the present invention is to provide a film advancing mechanism for cameras, which is capable of being compact and reducing costs and noise. In the film advancing of the present invention, supporting section, which is extended from a supporting member of a reduction gear unit, is inserted in a spool so as to rotatably support the spool. A driving motor is fixed to a bottom face of the supporting section by a screw so as to accommodate the driving motor in the spool. An output shaft of the driving motor is extended into the spool via a through-hole, which is bored in the bottom face of the supporting section. A motor-gear is made of plastic and fixed to the output shaft in the spool. Reduction gears are provided in one plane in the supporting section, A transmitting gear and/or a sun gear is provided to bridge over an edge of the spool so as to mutually engage.

8 Claims, 8 Drawing Sheets

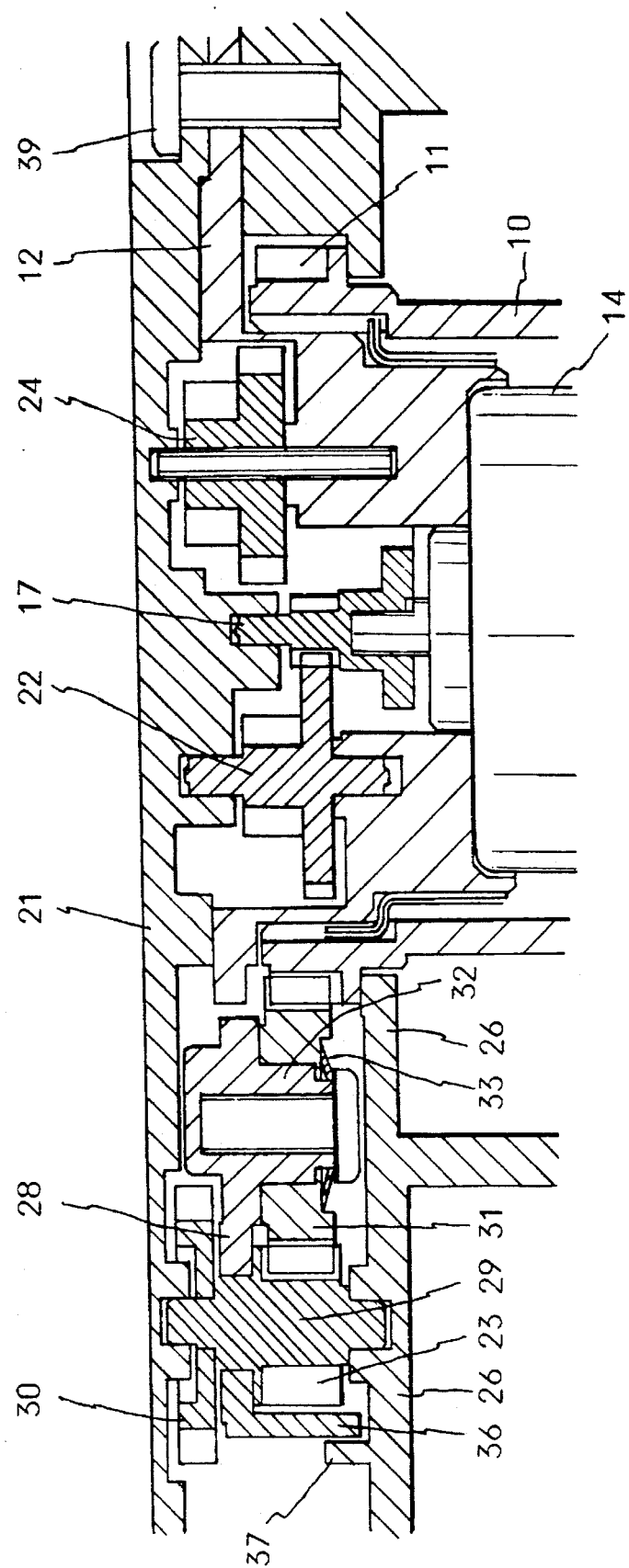

FILM ADVANCING MECHANISM

BACKGROUND OF THE INVENTION

The present invention relates to a film advancing mechanism for cameras, more precisely relates to a film advancing mechanism, which is capable of advancing and rewinding a film.

In conventional cameras, a film advancing mechanism includes a spool, which is rotatably supported in a camera proper, having a spool-gear. A driving motor has an output shaft, a motor-gear is fixed to the output shaft, and a reduction gear unit is communicated with the motor-gear. The reduction gear unit has a transmitting gear, and a sun gear of a swing gear unit or a clutch unit is engaged with the transmitting gear. The swing gear unit has a swing arm, which is capable of swinging about a shaft, said sun gear, which is provided on the swing arm and capable of rotating about the shaft, and a switching gear, which is provided to a front end section of the swing arm and engaged with the sun gear. The switching gear is capable of selectively engaging with an advancing gear for advancing a film and a rewinding gear for rewinding the film on the basis of positions of the swing arm.

When the driving motor rotates the output shaft in the normal direction, driving force is transmitted to the sun gear via the transmitting gear, so that the swing arm is swung toward the spool-gear. Then the switching gear is engaged with the advancing gear, so that a film is advanced and wound around the spool. On the other hand, when the driving motor rotates the output shaft in the reverse direction, the swing arm is swung in the opposite direction. Then the switching gear is engaged with the rewinding gear, so that the film is rewound.

These days cameras have become smaller and smaller, so the film advancing mechanism assembled for cameras is also required to be smaller.

In the conventional film advancing mechanism, the reduction gear unit includes a multiple reduction gears, so that the unit must be large and has a complex structure. Having the large and complex structure, the mechanism or camera having the same must be expensive.

The size of the film advancing mechanism depends on sizes of reduction gears in the reduction gear unit. It is possible to employ hard metal gears but using such gears with higher accuracy will raise manufacturing cost of the mechanism.

Further, metal gears cause a tremendous noise while advancing and rewinding a film.

SUMMARY OF THE INVENTION

An object of the present invention is to provide a film advancing mechanism for cameras, which is capable of being compact and reducing costs and noise.

To achieve the object, a first basic structure of the film advancing mechanism of the present invention has characteristics:

a supporting section, which is extended from a supporting member of a reduction gear unit, is inserted in a spool so as to rotatably support the spool;

a driving motor, is fixed to a bottom face of the supporting section by a screw so as to accommodate the driving motor in the spool;

an output shaft of the driving motor is extended into the spool via a through-hole, which is bored in the bottom face of the supporting section;

a motor-gear is made of plastic and fixed to the output shaft in the spool;

reduction gears are provided in one plane in the supporting section; and a transmitting gear or a sun gear is provided to bridge over an edge of the spool so as to mutually engage.

A second basic structure has characteristics:

a spool is rotatably supported on a supporting section of a supporting member of a reduction gear unit;

a driving motor is fixed to a bottom face of the supporting section so as to accommodate the driving motor in the spool;

an output shaft of the driving motor is extended into the spool via a through-hole, which is bored in the bottom face of the supporting section;

a motor-gear is made of a soft material and fixed to the output shaft;

a first reduction gear of reduction gears, which engages with the motor-gear, is made of a soft material;

the supporting member is made of two parts;

the driving motor is fixed to the supporting member; and a portion of the supporting member, which correspond to the first reduction gear, is made of a soft material.

And a third basic structure has characteristics:

a supporting section, which is extended from a supporting member of a reduction gear unit, is inserted in a spool so as to rotatably support the spool, the supporting section is covered with a head case;

a driving motor is fixed to a bottom face of the supporting section so as to accommodate the driving motor in the spool;

an output shaft of the driving motor is extended into the spool via a through-hole, which is bored in the bottom face of the supporting section;

a motor-gear is fixed to the output shaft on the supporting section;

reduction gears are a first gear and a second gear, each of which has a large gear section and a small gear section, the first gear and the second gear are rotatably provided between the supporting section and the head case;

the large gear section of the first gear is located on the supporting section side and engaged with the motor-gear, and the small gear section thereof is located on the head case side and engaged with the large gear section of the second gear;

the large gear section of the second gear is located on the head case side, and the small gear section thereof is located on the supporting section side and located outside of an end of the spool for transmitting force;

height of the swing arm is almost the same as that of the large gear section of the second gear; and a sun gear and a switching gear are located on the supporting section side with respect to a swing arm.

In the film advancing mechanism of the present invention, the supporting section is inserted into the spool. A reduction gear unit including the reduction gears are provided in the supporting section. And the sun gear or the transmitting gear is bridged over the edge of the spool so as to transmit the driving force. Thus, substantial thickness of the reduction gears can be reduced, so that the film advancing mechanism can be compacted and smaller, and noise can be reduced.

BRIEF DESCRIPTION OF THE DRAWINGS

Embodiments of the present invention will now be described by way of examples and with reference to the accompanying drawings, in which:

FIG. 3 is a sectional view from another view point showing the gears therein;

DETAILED DESCRIPTION OF THE PREFERRED EMBODIMENTS

Preferred embodiments of the present invention will now be described in detail with reference to the accompanying drawings.

First Embodiment

Figure 1:
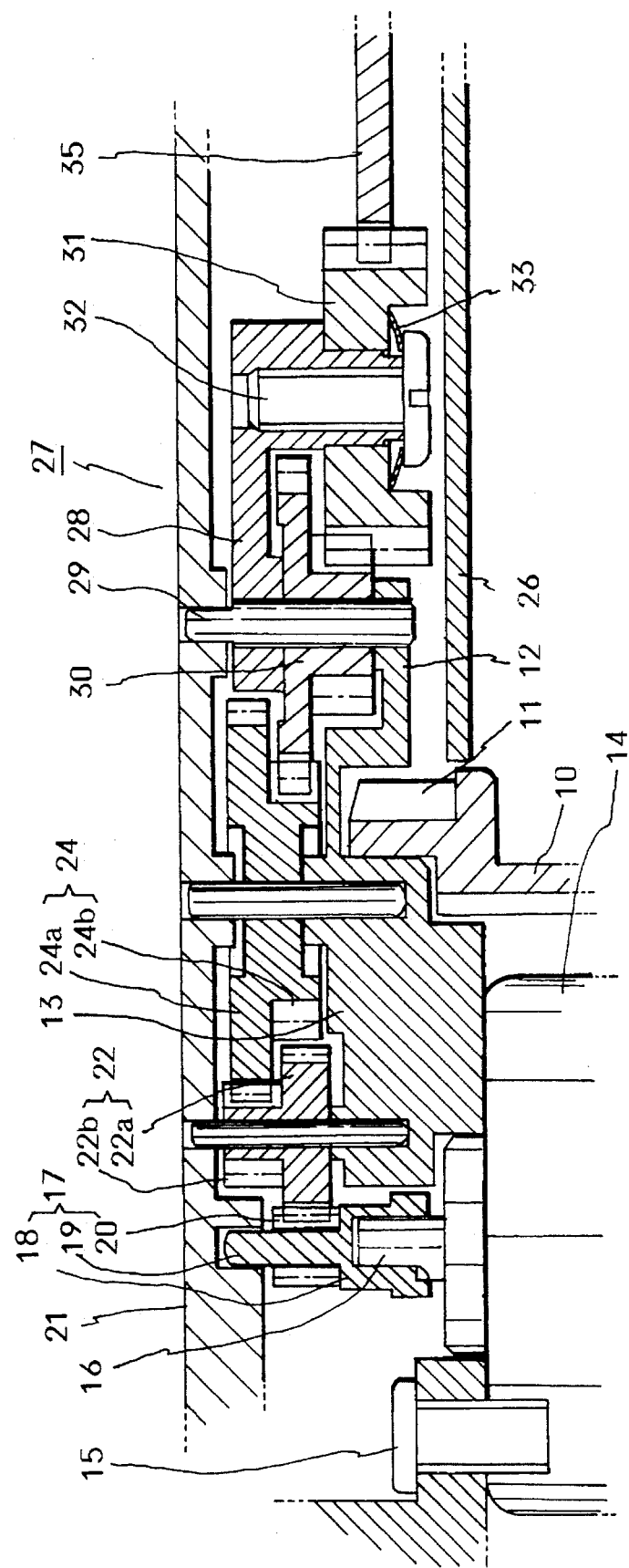
FIG. 1 is a sectional view showing gears in a film advancing mechanism of a first embodiment.
Figure 2:
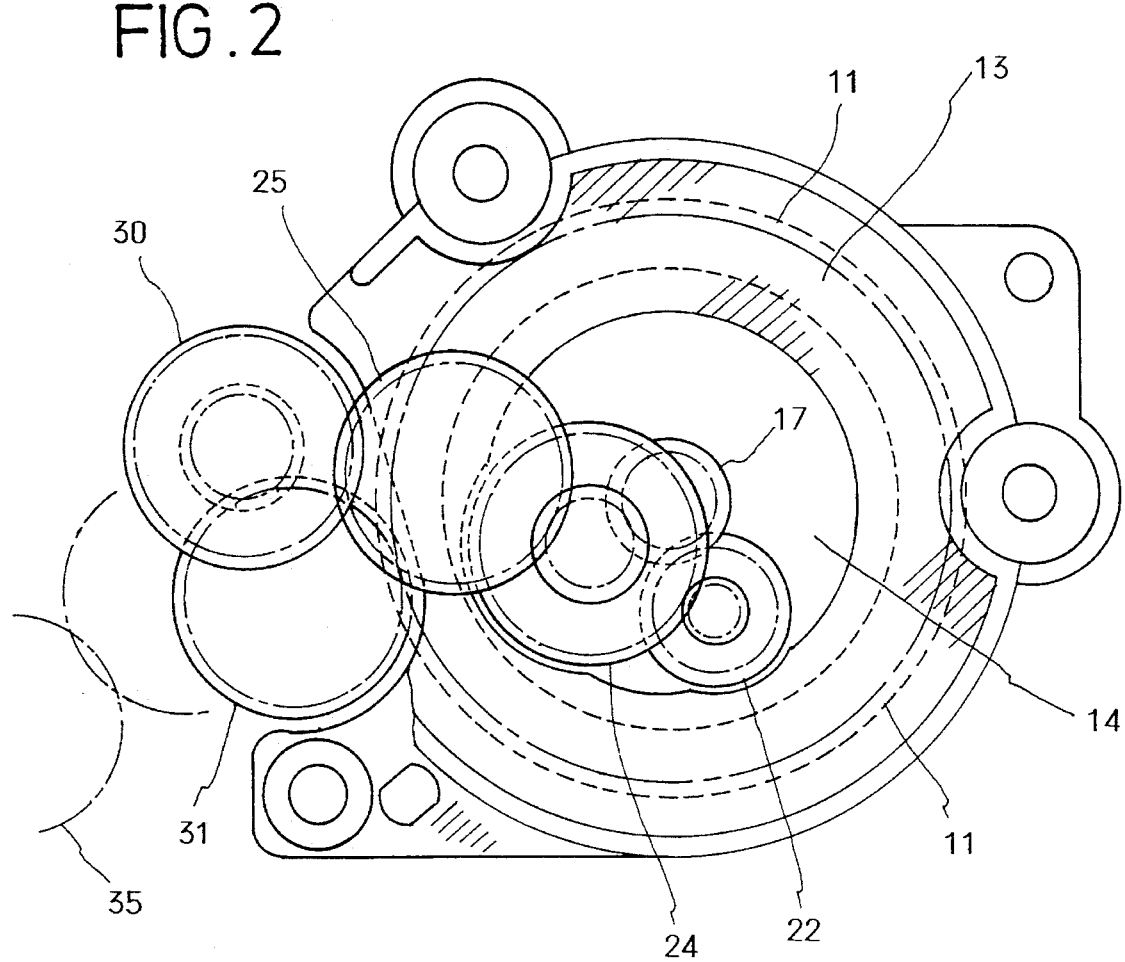
FIG. 2 is a plan view showing the gears therein.
Figure 4:
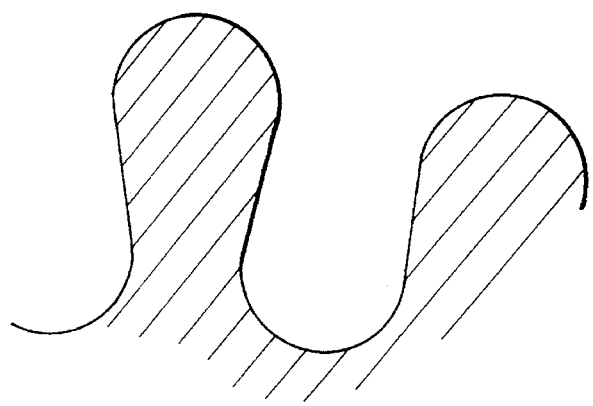
FIG. 4 is an explanation view showing undercut shapes of gear teeth.

A first embodiment will be explained with reference to FIGS. 1–4. FIG. 1 is a sectional view showing gears in a film advancing mechanism of the first embodiment. FIG. 2 is a plan view showing the gears therein.

A spool 10 has a cylindrical shape. A spool-gear 11 is formed on an outer circumferential face of one end section of the spool 10. The spool 10 is supported on a supporting section 13, which has a bottomed cylindrical shape, of a supporting member 12 for supporting reduction gears. The spool 10 is capable of rotating about its axis. There are formed a plurality of feed claws (not shown), which is capable of engaging film holes of a film and advancing the film, on the outer circumferential face of the spool 10.

A driving motor 14 is accommodated in the spool 10. The driving motor 14 is fixed on a bottom face of the supporting section 13 by a screw 15. An output shaft 16 of the motor 14 is pierced through a through-hole, which is bored in the bottom face of the supporting section 13, and projected into an inner space thereof. A sectional shape of a front end section of the output shaft 16 is D-shape.

A motor-gear 17, which is made of plastic, has a boss section 16, a shaft section 19 and a tooth section 20. The boss section 18 is fitted to the output shaft 16, so that the motor-gear 17 is capable of rotating together with the output shaft 16. A front end of the shaft section 19 is rotatably held by a head case 21, so that vibration of the motor-gear 17 can be prevented. The tooth section 20 is formed on an outer circumferential face of the shaft section 19, and its tooth-bottom diameter is smaller than diameter of the output shaft 16. Number of teeth of the motor-gear 17 may be 5–7.

Note that, the supporting member 12 and the head case 21 are integrally fixed to a camera body 26 by a screw 39.

A reduction gear 22 has a large gear section 22a, which is engaged with the motor-gear 17, and a small gear section 22b. A reduction gear 24 has a large gear section 24a, which is engaged with the small gear section 22b, and a small gear section 24b. A transmitting gear 25 is engaged with the small gear section 24b. A plate-like gear proper of the transmitting gear 25 is provided to bridge over an end edge of the spool 10, so that a part of teeth of the transmitting gear 25 are projected outward from the edge of the spool 10.

The reduction gears 22 and 24 are provided in the inner space of the bottomed cylindrical supporting section 13.

The reduction gears 22 and 24 and the transmitting gear 25 are made of a reinforced plastic.

Number of teeth of the small gear sections 22b and 24b are designed 6–7.

A swing gear unit 27 is provided between the head case 21 and the camera body 26. A swing arm 28 is located outer side of the spool 10, and fitted to a shaft 29 by frictional force. The shaft 29 is rotatably held between the head case 21 and the camera body 26, so that the swing arm 28 is capable of swinging about the shaft 29. A gear 30 is fitted to the shaft 29 and engaged with the transmitting gear 25. A sun gear 23 is formed on an outer circumferential face of the shaft 29. A slide plate 36 is provided at an end of the swing arm 28. The slide plate 36 is guided by an arc guide 36, which is fixed to the camera body 36, so as to prevent the shaft 29 from vibrating.

A switching gear 31 is capable of rotating about a shaft 32, which is provided on a front end section of the swing arm 28. The switching gear 31 is engaged with the sun gear 23. The switching gear 31 is biased toward the swing arm 28 by a spring 33, so that the switching gear 31 rotates with friction between the switching gear 31 and the swing arm 28. When the swing arm 28 is swung toward the spool 10, the switching gear 31 is engaged with the spool-gear 11 (see FIG. 3). On the other hand, when the the swing arm 28 is swung in the opposite direction, the switching gear 31 is engaged with a rewinding gear 35. Note that, the switching gear 31 may be communicated with the spool-gear 11 via a gear or gears (not shown).

The gears in the swing gear unit 27, the rewinding gear 35 are also made of a plastic.

In the film advancing mechanism having above described structure, when the motor 14 rotates in the normal direction, the transmitting gear 25, which is communicated with the motor-gear 17 and the reduction gears 22 and 24, is rotated in a predetermined direction. With the rotation of the transmitting gear 25, the sun gear 23 is rotated with the gear 30. The sun gear 23 is engaged with the switching gear 31, which requests prescribed torque for rotation. Thus, prescribed torque is also required to rotate the sun gear 23, so the resistance force of the sun gears 23 and the switching gear 31 cause the swing arm 28 to swing toward the spool 10. By the swing of the swing arm 28, the switching gear 31 is engaged with the spool-gear 11, so that the spool 10 is rotated to advance the film. The film advanced is wound round the spool 10.

On the other hand, when the motor 14 rotates in the reverse direction, the transmitting gear 25 is rotated in the opposite direction, so that the swing arm 28 is swung in the opposite direction. Then the switching gear 31 is engaged with the rewinding gear 35. By rotating the rewinding gear 35, the film advanced is rewound in a film cartridge by a known mechanism (not shown).

As described above, the supporting section 13 is inserted into the bottomed cylindrical spool 10; a reduction gear unit including the reduction gears are provided in the supporting section 13; and the plate-like gear proper of the transmitting gear 25 is bridged over the edge of the spool 10 so as to transmit the driving force, Thus, substantial thickness of the reduction gears can be reduced, so that the film advancing mechanism can be compacted and smaller.

Since not only the tooth-bottom diameter of the tooth section 20 of the motor-gear 17 is smaller than the diameter of the output shaft 16 but the diameter of the shaft section 19 is small, the tooth-bottom diameter can be quite small. The number of teeth of the motor-gear should be 8–9 in the conventional film advancing mechanism; that of the motor-gear 17 can be 5–7 in the present embodiment. By the small number of teeth, the reduction ratio can be greater in the present embodiment. Note that, the number of teeth of the small gear sections 22b and 24b of the reduction gears 22 and 24 is also designed 6–7.

Generally, it is very difficult for small gears to reduce the number of teeth.

The tooth strength (P) is formulated as follow:

$$P = \sigma\, m\, b\, Y$$

$$\begin{bmatrix} \sigma: \text{material stress} \\ m: \text{module} \\ b: \text{tooth thickness} \\ Y: \text{tooth form factor} \end{bmatrix}$$

In general metal gears, since metals have great material stress ($\sigma$), great tooth strength (P) can be gained even if the module (m) is reduced, the pitch circle is smaller, and the number of teeth is greater. Namely, small gears can be made of metals.

On the other hand, in conventional plastic gears, since plastics have small material stress ($\sigma$), the module (m) must be greater so as to get enough tooth strength (P). Therefore, the pitch circle must be greater and gears must be larger in size. By employing large gears, cameras must be large in size.

To make module (m) greater with small pitch circle, the number of teeth should be reduced. In involute gears whose number of teeth is at or less than 13, however, undercut sections must be formed, so that the number of teeth of metal gears, which are made, by cutting, must be at or less than eight. In case of conventional plastic gears, gears can be formed even if the undercut sections are formed. But if large undercut sections are formed in root sections of each tooth (see FIG. 4), the tooth strength (P) of plastic gears must be quite small, and such weak gears cannot be employed.

In involute gears, the undercut sections depend on the tooth form factor (Y), the module (m) and the coefficient of shift (X). The inventor thought that the undercut sections could be omitted by reducing the number of teeth. Namely, by designing the number of teeth 6–7, the undercut sections can be almost omitted, and the tooth strength (P) required can be gained. Data of the gears in the present embodiment will be shown in the following TABLE.

TABLE

| | MOTOR GEAR | GEAR 22 LARGE SEC. | GEAR 22 SMALL SEC. | GEAR 24 LARGE SEC. | GEAR 24 SMALL SEC. | TRANS- MITTING GEAR | GEAR 30 | GEAR 23 | SWITCH- ING GEAR | SPOOL |
|---|---|---|---|---|---|---|---|---|---|---|
| NUMBER OF TEETH | 6 | 28 | 6 | 15 | 7 | 16 | 16 | 7 | 16 | 46 |
| MODULE (m) | 0.2 | | | 0.33 | | 0.4 | | | | |
| COEFFICIENT OF SHIFT | 0.7679 | 0.2 | 0.6576 | 0.2 | 0.7925 | 0.394 | 0.394 | 0.7925 | 0.394 | −0.5 |
| TOOTH FORM FACTOR (Y) | 0.663 | 0.645 | 0.599 | 0.567 | 0.693 | 0.648 | 0.648 | 0.693 | 0.648 | 0.57 |
| TOOTH WIDTH (b) | 0.8 | | | 1.2 | 1.2 | 1.0 | 1.7 | | 1.6 | |

As shown in the TABLE, the coefficient of shift (X) of the small gear sections 22b and 24b are 0.599 and 0.693. That of conventional gears is around 0.5.

Note that, in involute gears, if the coefficient of shift (X) is greater, so-called contact angle is greater, and the bearing loss is greater. In the present embodiment, the coefficient of shift (X) is designed as great as possible in a range in which shafts received no bad influences, so that the gears have no undercut sections and enough tooth strength (P). By employing above design, the module (m) and the tooth strength (P) required can be great in spite of relatively small pitch circle and gear diameter. Furthermore, the reduction gears 22 and 24 can be small in size, so that they can be provided in the bottomed cylindrical supporting section 13, so that the reduction gear unit can be compacted and small in size.

In the present embodiment, a plate-like gear proper of the gear 30 my be bridged over the edge of the spool 10 instead of that of the transmitting gear 25. The sun gear 23 and the gear 30 may be integrally connected. And number of the reduction gears may be more than two, e.g., 6, 7, . . .

In the film advancing mechanism of the first embodiment, the supporting section is inserted into the bottomed cylindrical spool; a reduction gear unit including the reduction gears are provided in the supporting section; and the sun gear or the transmitting gear is bridged over the edge of the spool so as to transmit the driving force. Thus, substantial thickness of the reduction gears can be reduced, so that the film advancing mechanism can be compacted and smaller, and noise can be reduced.

Since the tooth-bottom diameter of the tooth section of the motor-gear is smaller than the diameter of the output shaft of the driving motor, the number of teeth of the motor-gear can be reduced to 5–7, so that the reduction ratio can be greater.

In general involute plastic gears, if the number of teeth is at or less than eight, the undercut sections must be formed and the tooth strength must be quite small. But, in the present embodiment, the coefficient of shift is designed as great as possible in a range in which shafts received no bad influences, so that the gears whose number of teeth is 6–7 can have no undercut sections and enough tooth strength. By reducing the number of teeth, the module and the tooth strength can be great in spite of small pitch circle. Therefore, plastic small gears can be realized and the film advancing mechanism can be compacted and small in size.

Second Embodiment

Figure 5:
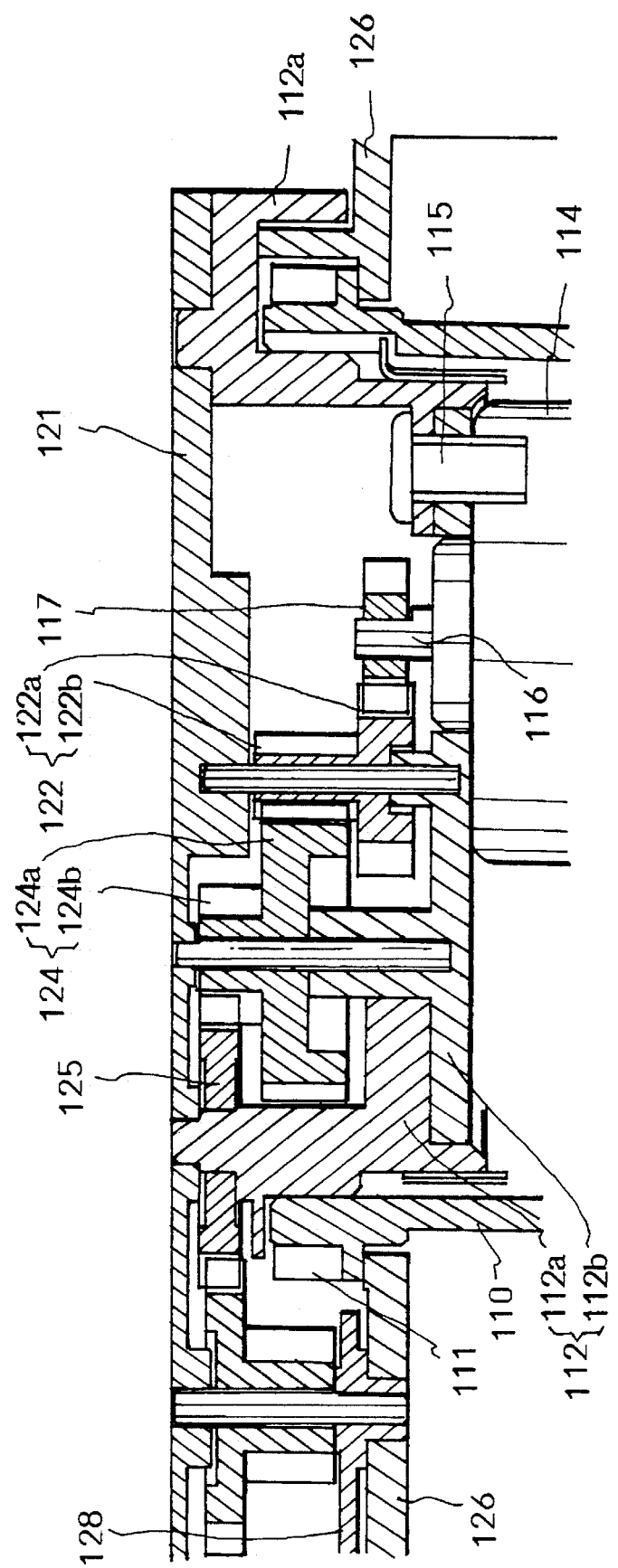
FIG. 5 is a sectional view showing gears in a film advancing mechanism of a second embodiment.
Figure 6:
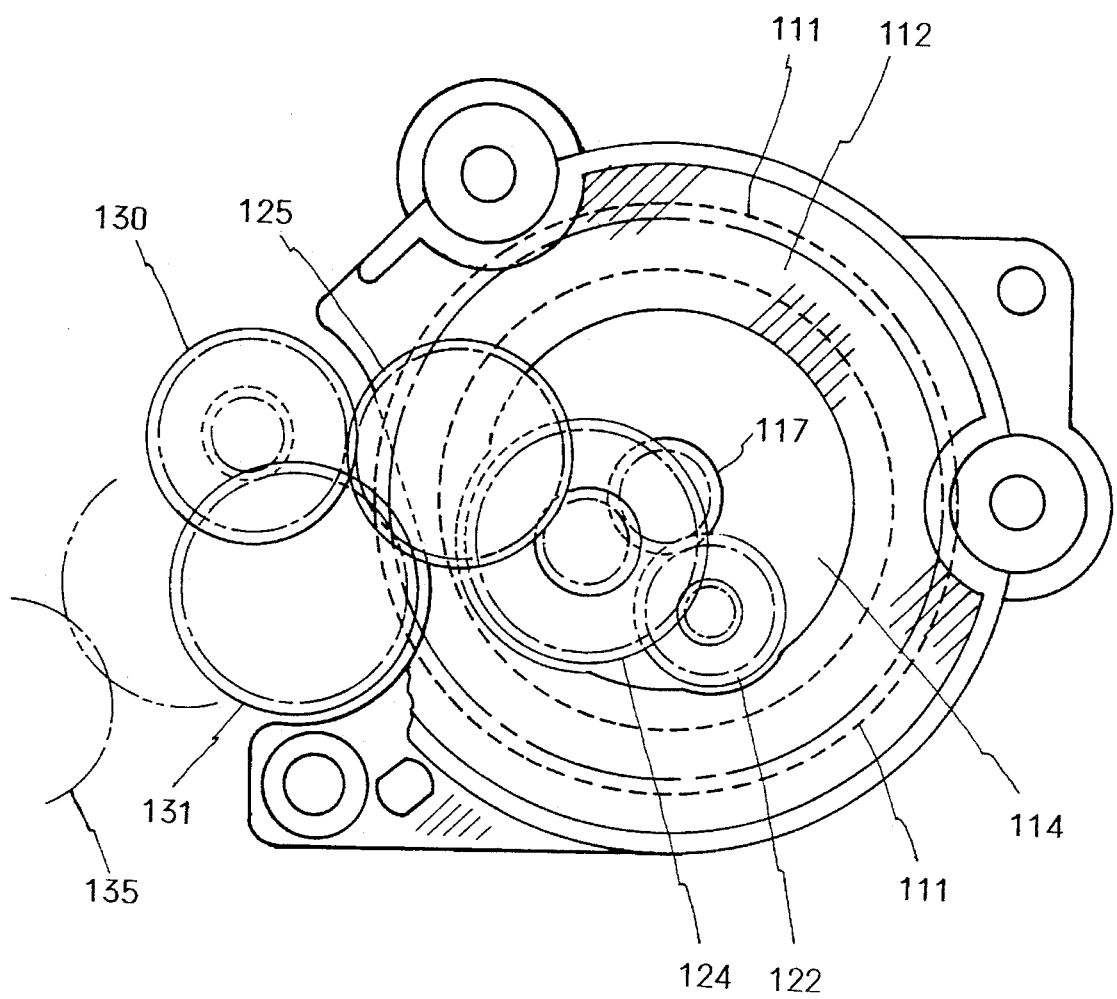
FIG. 6 is a plan view showing the gears therein.
Figure 7:
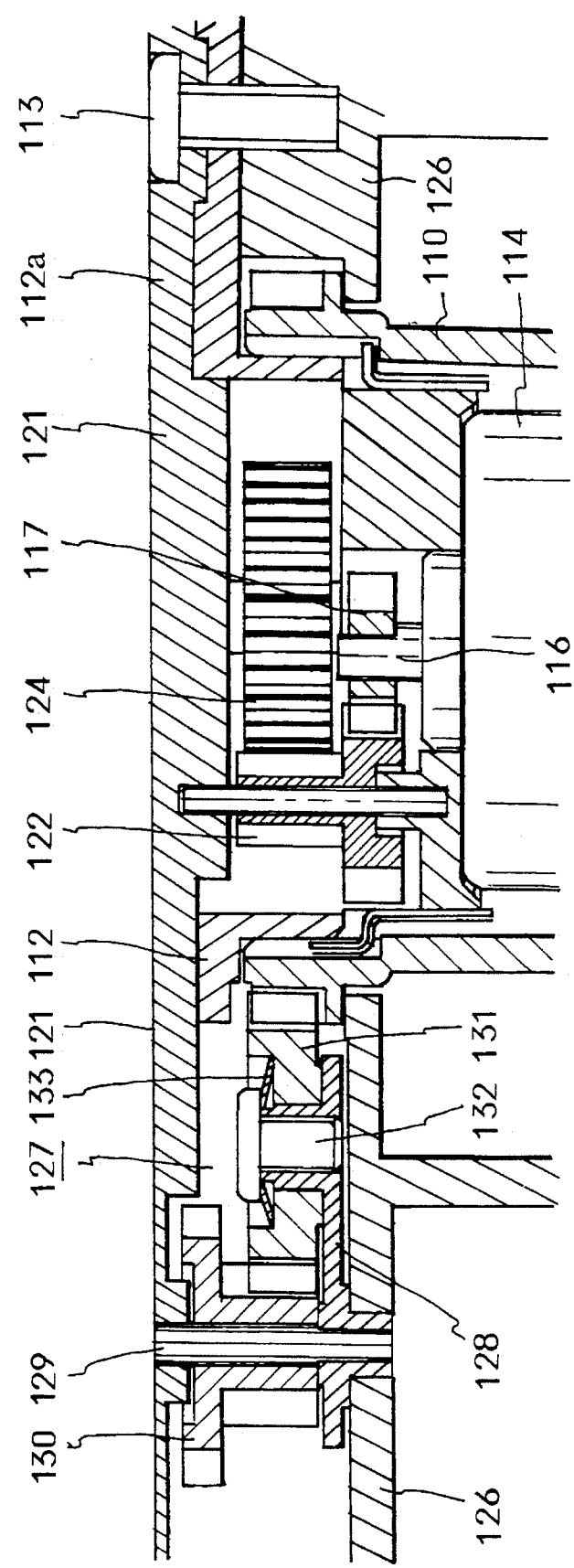
FIG. 7 is a sectional view from another view point showing the gears therein.

A second embodiment will be explained with reference to FIGS. 5–7. FIG. 5 is a sectional view showing gears in the film advancing mechanism of the second embodiment; FIG. 6 is a plan view showing the gears therein; and FIG. 7 is a sectional view from another view point showing the gears.

A spool 110 has a cylindrical shape. A spool-gear 111 is formed on an outer circumferential face of one end section of the spool 110. The spool 110 is supported on a supporting member 112, which supports reduction gears. The spool 110 is capable of rotating about its axis. There are formed a plurality of feed claws (not shown), which is capable of engaging film holes of a film and advancing the film, on the outer circumferential face of the spool 110.

The supporting member 112 has a supporting section 112a, which is fitted in the spool 110, and a supporting section 112b, which is fitted in a lower section of the supporting section 112a. The supporting section 112a is made of a relatively hard plastic; the supporting section 112b is made of a soft material, e.g., nylon-12, rubber.

A driving motor 114 is fixed on a bottom face of the supporting section 112b by a screw 115. The driving motor 114 is accommodated in the spool 110. An output shaft 116 of the motor 114 is pierced through a through-hole, which is bored in the bottom face of the supporting section 112b, and projected therefrom. A sectional shape of a front end section of the output shaft 116 is D-shape. The supporting section 112b, which is made of the soft material, is held between the supporting section 112a and the driving motor 114, and the three members are integrally connected by a screw 115. The supporting section 112a is bridged over an end edge of the spool 110, so that a part of the supporting section 112a is projected outward, add the projected part is fixed to a head case 121 by a screw 113 (see FIG. 7).

A motor-gear 117 is also made of a soft material, e.g., nylon-12, rubber. To have greater reduction ratio, the number of teeth of the motor-gear 117 is designed to 6–8. Note that, a fitting hole of the motor-gear 117 is formed into D-shape in section, and the front end section of the output shaft, whose sectional shape is D-shape, is press-fitted in the fitting hole. With this structure, the motor-gear 117 can be reliably fixed to the output shaft 116 even if the motor-gear 117 is made of the soft material.

A first reduction gear 122 has a large gear section 122a, which is engaged with the motor-gear 117, and a small gear section 122b. A second reduction gear 124 has a large gear section 124a, which is engaged with the small gear section 122b, and a small gear section 124b. A transmitting gear 125 is engaged with the small gear section 124b. A plate-like gear proper of the transmitting gear 125 is provided to bridge over an end edge of the spool 110, so that a part of teeth of the transmitting gear 125 are projected outward from the edge of the spool 110.

The reduction gears 122 and 124 are rotatably provided at positions corresponding the spool 110, between the supporting section 112b, which is made of the soft material, and the head case 121. Note that, the transmitting gear 125 is rotatably provided between the supporting section 112a and the head case 121.

A swing gear unit 127 is provided between the head case 121 and the camera body 126. A swing arm 128 is located outer side of the spool 110, and fitted to a shaft 129 by frictional force. The shaft 129 is rotatably held between the head case 121 and the camera body 126, so that the swing arm 128 is capable of swinging about the shaft 129. A sun gear 130 is fitted to the shaft 129.

A switching gear 131 is capable of rotating about a shaft 132, which is provided on a front end section of the swing arm 128. The switching gear 131 is engaged with the sun gear 130. The switching gear 131 is biased toward the swing arm 128 by a spring 133, so that the switching gear 131 rotates with friction between the switching gear 131 and the swing arm 128. When the swing arm 128 is swung toward the spool 110, the switching gear 131 is engaged with the spool-gear 111. On the other hand, when the the swing arm 128 is swung in the opposite direction, the switching gear 131 is engaged with a rewinding gear 135. Note that, the switching gear 131 may be communicated with the spool-gear 111 via a gear or gears (not shown).

The transmitting gear 125, the sun gear 130 and the switching gear 131 are also made of a plastic.

In the present embodiment, the module of the large gear section 122a of the first reduction gear 122 is designed relatively great, e.g., around 0.3–0.4. By the greater module, the tooth strength can be greater even if the gear is made of the soft material.

To get great reduction ratio between the motor-gear 117 and the large gear section 122a of the first reduction gear 122, the number of teeth of the motor-gear 117 is designed 6–8. To balance the tooth strength of the motor-gear 117 and the large gear section 122a of the first reduction gear 122, the coefficient of shift of the motor-gear 117 may be great so as to make the tooth form factor greater; the tooth form factor of the large gear section 122a may be relatively small.

The module of the large gear section 124a of the second reduction gear 124, which is engaged with the small gear section 122b of the first reduction gear 122, is designed around 0.22–0.35, and the tooth width thereof is designed wider. The first reduction gear 122 is made of the soft material and the second reduction gear 124 is made of the relatively hard plastic. Thus, the tooth form factor of the small gear section 122b of the first reduction gear 122 is designed greater; that of the large gear section 124a of the second reduction gear 124 is designed smaller, so that the tooth strength of the both can be balanced.

In the film advancing mechanism having above described structure, when the motor 114 rotates in the normal direction, the transmitting gear 125, which is communicated with the motor-gear 117 and the reduction gears 122 and 124, is rotated in a predetermined direction. With the rotation of the transmitting gear 125, the sun gear 130 is rotated. The sun gear 130 is engaged with the switching gear 131, which requests prescribed torque for rotation. Thus, prescribed torque is also required to rotate the sun gear 130, so the resistance force of the sun gear 130 and the switching gear 131 cause the swing arm 128 to swing toward the spool 110. By the swing of the swing arm 128, the switching gear 131 is engaged with the spool-gear 111, so that the spool 110 is rotated to advance the film. The film advanced is wound round the spool 110.

On the other hand, when the motor 114 rotates in the reverse direction, the transmitting gear 125 is rotated in the opposite direction, so that the swing arm 128 is swung in the opposite direction. Then the switching gear 131 is engaged with the rewinding gear 135. By rotating the rewinding gear 135, the film advanced is rewound in a film cartridge by a known mechanism (not shown).

In the present embodiment, the motor-gear 117, which rotates at high speed, and the first reduction gear 122 are made of the soft material, so that noise caused therebetween can be reduced as much as possible.

The supporting section 112b to which the motor 114 is fixed is also made of the soft material, so that vibration of the motor 114 can be absorbed and the noise can be further reduced.

Since the motor-gear 117 and the first reduction gear 122 are made of the soft material, their strength maybe lower. But their strength can be raised by designing the module, etc.

Third Embodiment

Figure 8:
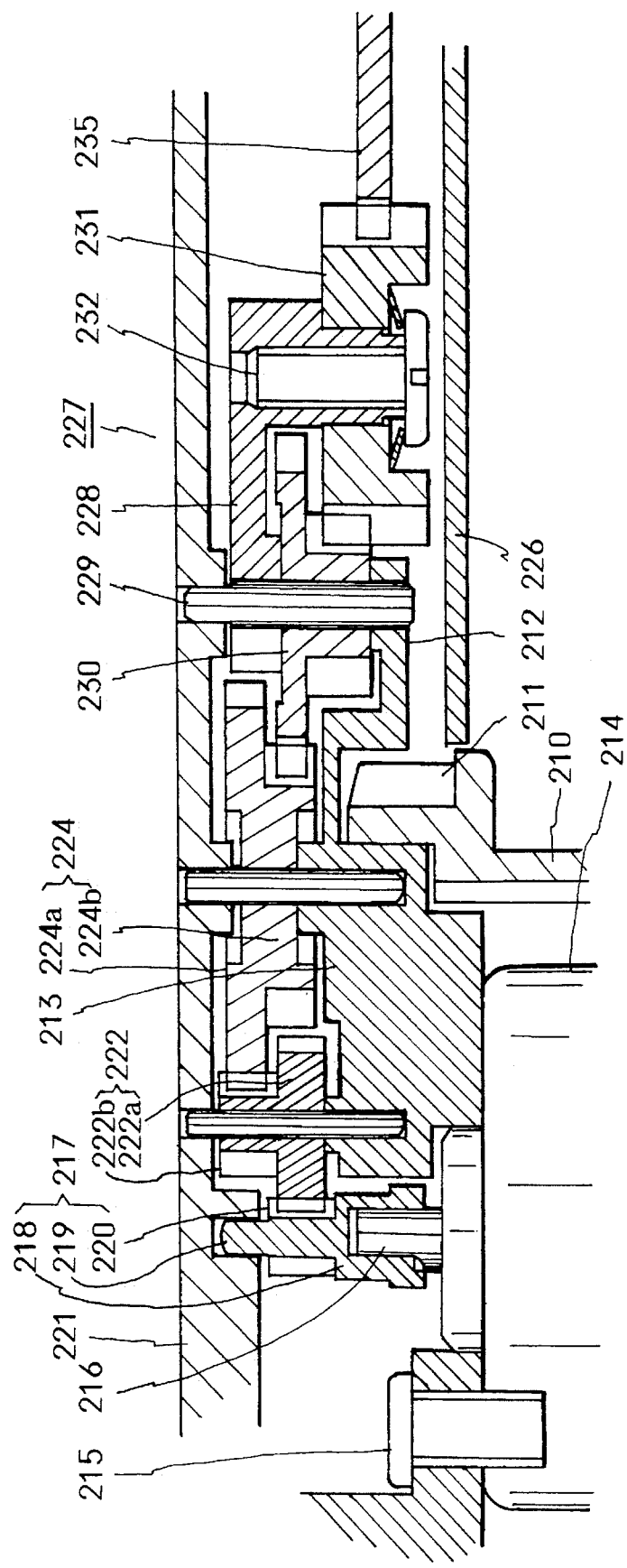
FIG. 8 is a sectional view showing gears in a film advancing mechanism of a third embodiment.
Figure 9:
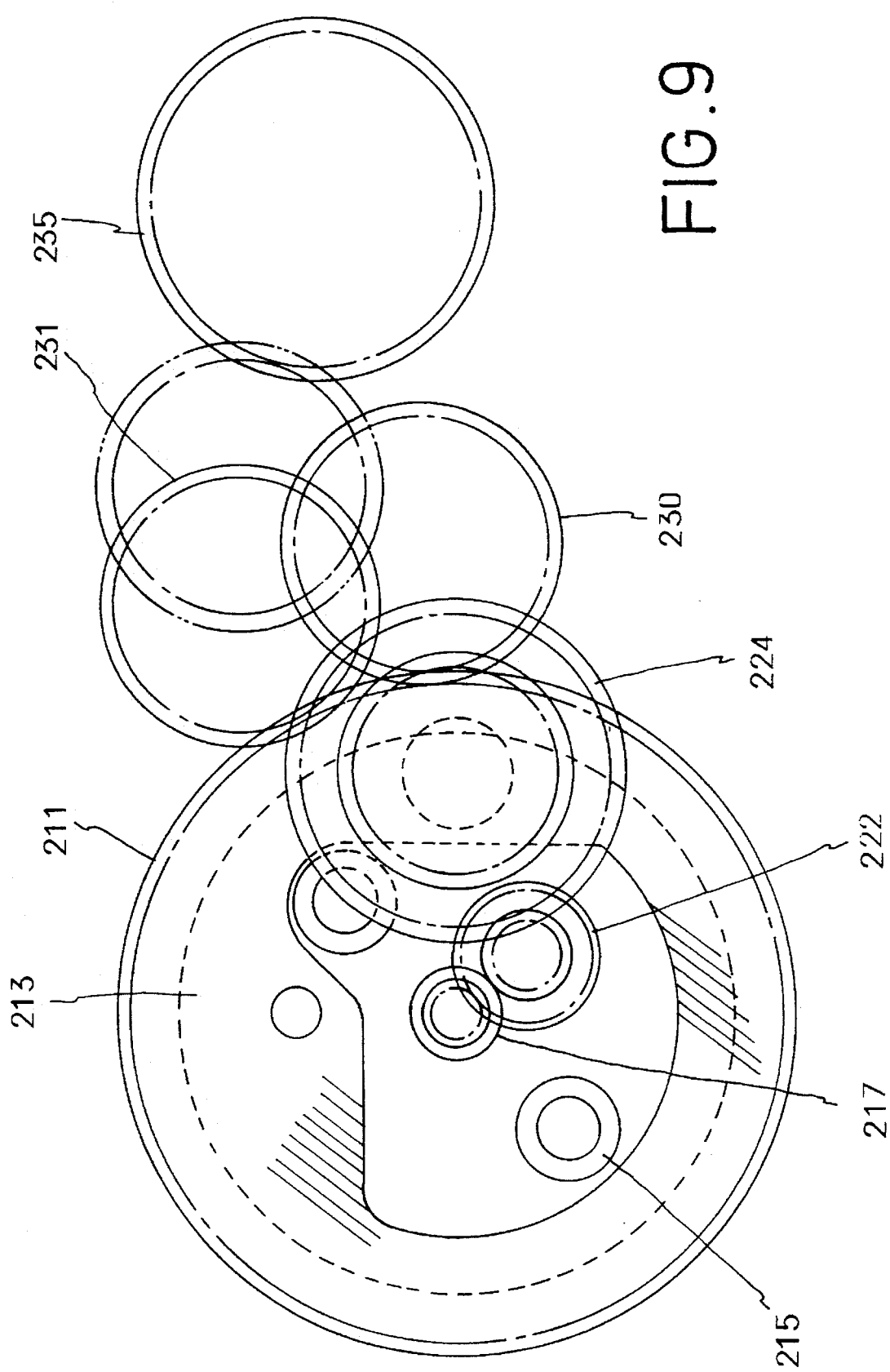
FIG. 9 is a plan view showing the gears therein.

A third embodiment will be explained with reference to FIGS. 8 and 9. FIG. 8 is a sectional view showing gears in a film advancing mechanism of the third embodiment; and FIG. 9 is a plan view showing the gears therein.

A spool 210 has a cylindrical shape. A spool-gear 211 is formed on an outer circumferential face of one end section of the spool 210. The spool 210 is supported on a supporting section 213 of a supporting member 212, which supports reduction gears. The spool 210 is capable of rotating about its axis. There are formed a plurality of feed claws (not shown), which is capable of engaging film holes of a film and advancing the film, on the outer circumferential face of the spool 210.

A driving motor 214 is fixed on a bottom face of the supporting section 213 by a screw 215. The driving motor 214 is accommodated in the spool 210. An output shaft 216 of the motor 214 is pierced through a through-hole, which is bored in the bottom face of the supporting section 213, and projected therefrom. A sectional shape of a front end section of the output shaft 216 is D-shape.

A motor-gear 217 is also made of a plastic. The motor-gear 217 has a boss section 218, a shaft section 219 and a tooth section 220. The boss section 218 of the motor-gear 217 has a fitting hole whose sectional shape is D-shape. The output shaft 216 is fitted in the fitting hole, so that the motor-gear 217 is capable of rotating together with the output shaft 216. A front end of the shaft section 219 of the motor-gear 217 is rotatably held by a head case 221, so that vibration of the motor-gear 217 can be prevented.

Tooth-bottom diameter of the tooth section 220 is smaller than diameter of the output shaft 216.

Number of teeth of the motor-gear 217 is 5–7.

The supporting member 212 is fixed to a camera body 226 together with the head case 221 by a screw (not shown).

A first reduction gear 222 has a large gear section 222a, which is engaged with the motor-gear 217, and a small gear section 222b. The first reduction gear 222 is rotatably supported between the supporting member 213 and the head case 221. A second reduction gear 224 has a large gear section 224a, which is engaged with the small gear section 222b, and a small gear section 224b. The second reduction gear 224 is rotatably supported between the supporting section 213 and the head case 221. The second reduction gear 224 works as a transmitting gear. In the present embodiment, the large gear section 224a and the small gear section 224b are provided to bridge over an end edge of the spool 210.

The gears 217, 222 and 224 will be explained in detail.

In the first reduction gear 222, the large gear section 222a is located on the supporting section 213 side; the small gear section 222b is located on the head case 221. The large gear section 222a is engaged with the motor-gear 217; the small gear section 222b is engaged with the large gear section 224a of the second reduction gear 224. In the second reduction gear 224, the large gear section 224a is located on the head case 221 side; the small gear section 224b is located on the supporting section 213. The small gear section 224b is projected outward from the end edge of the spool 210 and engaged with a sun gear as the transmitting gear.

A swing gear unit 227 is provided between the head case 221 and the camera body 226. A swing arm 228 is located outer side of the spool 210, and fitted to a shaft 229 by frictional force. The shaft 229 is rotatably held between the head case 221 and the supporting member 212, so that the swing arm 228 is capable of swinging about the shaft 229. The sun gear 230 is fitted to the shaft 229.

A switching gear 231 is capable of rotating about a shaft 232, which is provided on a front end section of the swing arm 228. The switching gear 231 is engaged with the sun gear 230. The switching gear 231 is biased toward the swing arm 228 by a spring 233, so that the switching gear 231 rotates with friction between the switching gear 231 and the swing arm 228.

In the present embodiment, height or vertical level of the swing arm 228 is almost equal to that of the large gear section 224a, which is located outside of the second reduction gear 224. And the sun gear 230 and the switching gear 231 are located on the supporting section 213 side. With this structure, even if the large and small gear sections 224a and 224b of the second reduction gear 224 are located outer side of the end edge of the spool 210, the sun gear 230 and the switching gear 231 are not projected from them. Therefore, height of a camera including the film advancing mechanism of the present embodiment can be small in vertical size.

When the swing arm 228 is swung toward the spool 210, the switching gear 231 is engaged with the spool-gear 211. On the other hand, when the the swing arm 228 is swung in the opposite direction, the switching gear 231 is engaged with a rewinding gear 135 (see FIG. 9). Note that, the switching gear 231 may be communicated with the spool-gear 211 via a gear or gears (not shown).

The motor-gear 217, the reduction gears 222 and 224, the sun gear 230 and the switching gear 231 are made of a plastic. Especially, the motor-gear 217 and the reduction gears 222 and 224 are preferably made of: a relatively soft plastic, which is a mixture of special nylon and whisker made from lubricant, e.g., fluorine, olefin, and potassium titanate, etc.; and a fiber reinforced plastic, which is a mixture of special nylon and glass fibers. The gears, which are mutually engaged, may be alternately made of the soft plastic and the fiber reinforced plastic.

In the film advancing mechanism having above described structure, when the motor 214 rotates in the normal direction, the second reduction gear 224, which is communicated with the motor-gear 217 and the first reduction gear 222, is rotated in a predetermined direction. With this rotation, the sun gear 230 is rotated. The sun gear 230 is engaged with the switching gear 231, which requests prescribed torque for rotation. Thus, prescribed torque is also required to rotate the sun gear 230, so the resistance force of the sun gear 230 and the switching gear 231 cause the swing arm 228 to swing toward the spool 210. By the swing of the swing arm 228, the switching gear 231 is engaged with the spool-gear 211, so that the spool 210 is rotated to advance the film. The film advanced is wound round the spool 210.

On the other hand, when the motor 214 rotates in the reverse direction, the swing arm 228 is swung in the opposite direction. Then the switching gear 231 is engaged with the rewinding gear 235. By rotating the rewinding gear 235, the film advanced is rewound in a film cartridge by a known mechanism (not shown).

In the present embodiment, the gear sections of the second reduction gear 224 are projected outward from the edge of the spool 210, namely they are provided free positions with respect to the spool 210, so that the size of the second reduction gear 224 can be optionally designed, and the reduction ratio also can be optionally and easily designed.

As described above, the height or vertical level of the swing arm 228 is almost equal to that of the large gear section 224a, which is located outside of the second reduction gear 224. And the sun gear 230 and the switching gear 231 are located on the supporting section 213 side. With this structure, even if the large and small gear sections 224a and 224b of the second reductions gear 224 are located outer side of the end edge of the spool 210, the sun gear 230 and the switching gear 231 are not projected from them. Therefore, height of a camera including the film advancing mechanism can be reduced the height.

If the gears, which are mutually engaged, are alternately made of the soft plastic and the fiber reinforced plastic, abrasion in the gears can be quite reduced. Thus, thin plastic gears can be realized, and the film advancing mechanism can be further compacted.

Note that, the inventor has used gears made of a fiber reinforced plastic for all gears in the film advancing mechanism so as to prevent abrasion. However, glass fibers mixed in the plastic mutually worked as files, so that the abrasion was increased.

As described above, since not only the tooth-bottom diameter of the tooth section 220 of the motor-gear 217 is smaller than the diameter of the output shaft 216 but also the shaft section 219 of the tooth section 220 is small, the number of teeth of the tooth section 220, which was designed 8–9 in the conventional mechanism can be reduced to 5–7, so that reduction ratio can be greater.

The invention may be embodied in other specific forms without departing from the spirit or essential characteristics thereof. The present embodiment is therefore considered all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A film advancing mechanism, comprising:

a spool being rotatably supported in a camera proper, said spool having a spool-gear;

a driving motor being provided in said spool, said driving motor having an output shaft;

a motor-gear being fixed to the output shaft of said driving motor;

a reduction gear unit being communicated with said motor-gear, said reduction gear unit having a plurality of reduction gears and a transmitting gear;

an advancing gear engaging with said spool-gear;

a rewinding unit for rewinding the film advanced;

a rewinding gear being communicated with said rewinding unit;

a swing gear unit having a swing arm, which is capable of swinging about a shaft, a sun gear, which is provided on said swing arm and capable of rotating about the shaft, and a switching gear, which is provided to a front end section of said swing arm and engaged with said sun gear, said switching gear being capable of selectively engaging with said advancing gear and said rewinding gear, wherein, a supporting section, which is extended from a supporting member of said reduction gear unit, is inserted in said spool so as to rotatably support said spool;

said driving motor is fixed to a bottom face of said supporting section by a screw so as to accommodate said driving motor in said spool;

the output shaft of said driving motor is extended into said spool via a through-hole, which is bored in the bottom face of said supporting section;

said motor-gear is made of plastic and fixed to the output shaft in said spool;

said reduction gears are provided in one plane in said supporting section; and said transmitting gear or said sun gear is provided to bridge over an edge of said spool so as to mutually engage.

2. The film advancing mechanism according to claim 1, wherein said reduction gears are two plastic gears, each of which has a large gear section and a small gear section, the coefficient of shift of said plastic gears is designed as great as possible, and number of teeth of each plastic gear is 6–7.

3. The film advancing mechanism according to claim 1, wherein said motor-gear has a boss section, which is fitted with the output shaft of said driving motor, a shaft section, which is coaxial to the output shaft thereof, and a tooth section having 5–7 teeth, which is formed on said shaft section and whose tooth-bottom diameter is smaller than diameter of said output shaft.

4. The film advancing mechanism according to claim 1, wherein said transmitting gear and said sun gear is provided to bridge over an edge of said spool so as to mutually engage.

5. A film advancing mechanism, comprising:

a spool being rotatably supported in a camera proper, said spool having a spool-gear;

a driving motor being provided in said spool, said driving motor having an output shaft;

a motor-gear being fixed to the output shaft of said driving motor;

a reduction gear unit being communicated with said motor-gear, said reduction gear unit having a plurality of reduction gears and a transmitting gear;

an advancing gear engaging with said spool-gear;

a rewinding unit for rewinding the film advanced;

a rewinding gear being communicated with said rewinding unit;

a swing gear unit having a swing arm, which is capable of swinging about a shaft, a sun gear, which is provided on said swing arm and capable of rotating about the shaft, and a switching gear, which is provided to a front end section of said swing arm and engaged with said sun gear, said switching gear being capable of selectively engaging with said advancing gear and said rewinding gear, wherein said spool is rotatably supported on a supporting section of a supporting member of said reduction gear unit;

said driving motor is fixed to a bottom face of said supporting section so as to accommodate said driving motor in said spool;

the output shaft of said driving motor is extended into said spool via a through-hole, which is bored in the bottom face of said supporting section;

said motor-gear is made of a soft material and fixed to the output shaft;

a first reduction gear of said reduction gears, which engages with said motor-gear, is made of a soft material;

said supporting member is made of two parts;

said driving motor is fixed to said supporting member; and a portion of said supporting member, which correspond to the first reduction gear, is made of a soft material.

6. The film advancing mechanism according to claim 5, wherein said motor-gear has a boss section, which is fitted with the output shaft of said driving motor, a shaft section, which is coaxial to the output shaft thereof, and a tooth section having 5–7 teeth, which is formed on said shaft section and whose tooth-bottom diameter is smaller than diameter of said output shaft.

7. A film advancing mechanism, comprising:

a spool being rotatably supported in a camera proper, said spool having a spool-gear;

a driving motor being provided in said spool, said driving motor having an output shaft;

a motor-gear being fixed to the output shaft of said driving motor;

a reduction gear unit being communicated with said motor-gear, said reduction gear unit having a plurality of reduction gears;

an advancing gear engaging with said spool-gear;

a rewinding unit for rewinding the film advanced;

a rewinding gear being communicated with said rewinding unit;

a swing gear unit having a swing arm, which is capable of swinging about a shaft, a sun gear, which is provided on said swing arm and capable of rotating about the shaft, and a switching gear, which is provided to a front end section of said swing arm and engaged with said sun gear, said switching gear being capable of selectively engaging with said advancing gear and said rewinding gear, wherein, a supporting section, which is extended from a supporting member of said reduction gear unit, is inserted in said spool so as to rotatably support said spool, said supporting section is covered with a head case;

said driving motor is fixed to a bottom face of said supporting section so as to accommodate said driving motor in said spool;

the output shaft of said driving motor is extended into said spool via a through-hole, which is bored in the bottom face of said supporting section;

said motor-gear is fixed to the output shaft on said supporting section;

said reduction gears are a first gear and a second gear, each of which has a large gear section and a small gear section, said first gear and said second gear are rotatably provided between said supporting section and said head case;

the large gear section of said first gear is located on said supporting section side and engaged with said motor-gear, and the small gear section thereof is located on said head case side and engaged with the large gear section of said second gear;

the large gear section of said second gear is located on said head case side, and the small gear section thereof is located on said supporting section side and located outside of an end of said spool for transmitting force;

height of said swing arm is almost the same as that of the large gear section of said second gear; and said sun gear and said switching gear are located on said supporting section side with respect to said swing arm.

8. The film advancing mechanism according to claim 7, wherein said motor-gear has a boss section, which is fitted with the output shaft of said driving motor, a shaft section, which is coaxial to the output shaft thereof, and a tooth section having 5–7 teeth, which is formed on said shaft section and whose tooth, bottom diameter is smaller than diameter of said output shaft.

* * * * *